United States Patent
Matsuoka et al.

(10) Patent No.: US 8,107,994 B2
(45) Date of Patent: Jan. 31, 2012

(54) MULTIMODE COMMUNICATION APPARATUS

(75) Inventors: Akihiko Matsuoka, Kanagawa (JP); Katsuaki Abe, Kanagawa (JP); Kentaro Miyano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1476 days.

(21) Appl. No.: 11/569,163

(22) PCT Filed: Dec. 21, 2005

(86) PCT No.: PCT/JP2005/023480
§ 371 (c)(1), (2), (4) Date: Nov. 16, 2006

(87) PCT Pub. No.: WO2006/087868
PCT Pub. Date: Aug. 24, 2006

(65) Prior Publication Data
US 2007/0230381 A1 Oct. 4, 2007

(30) Foreign Application Priority Data

Feb. 16, 2005 (JP) .................................. 2005-039191
Aug. 3, 2005 (JP) .................................. 2005-225385

(51) Int. Cl.
H04M 1/00 (2006.01)
(52) U.S. Cl. ................... 455/550.1; 455/561; 455/560; 455/552.1; 455/557; 455/436; 370/431; 370/345; 370/351; 370/352; 370/353
(58) Field of Classification Search ................ 455/550.1, 455/561, 560
See application file for complete search history.

(56) References Cited

U.S. PATENT DOCUMENTS

| 6,104,721 | A | * | 8/2000 | Hsu ............................. 370/431 |
| 7,092,733 | B2 | * | 8/2006 | Mukai et al. ............... 455/552.1 |
| 7,706,840 | B2 | * | 4/2010 | Hageman ..................... 455/561 |
| 2002/0098864 | A1 | | 7/2002 | Mukai et al. |
| 2004/0063425 | A1 | | 4/2004 | Wakutsu et al. |

FOREIGN PATENT DOCUMENTS

| JP | 2002-335186 | | 11/2002 |
| JP | 2003-229781 | A | 8/2003 |
| JP | 2004-128559 | A | 4/2004 |

OTHER PUBLICATIONS

Japanese Office action for Appl. No. JP 2005-225385 dated Jun. 8, 2010.

* cited by examiner

*Primary Examiner* — Charles Appiah
*Assistant Examiner* — Randy Peaches
(74) *Attorney, Agent, or Firm* — Pearne & Gordon LLP

(57) ABSTRACT

A multimode communication apparatus capable of varying a function of a signal processing portion without external resource control is provided. The multimode communication apparatus includes a radio portion 103 for conducting a radio communication, a plurality of signal processing devices 105, 106 whose function can be varied by resource control, and a storing portion 109 for storing data defining a resource controlling function that is executable on a plurality of signal processing devices 105, 106. Since the resource controlling function is furnished into any of the signal processing devices 105, 106, the function of the signal processing devices 105, 106 can be varied not to provide a resource controlling portion to the outside of the signal processing device.

52 Claims, 8 Drawing Sheets

MULTIMODE COMMUNICATION APPARATUS

TECHNICAL FIELD

The present invention relates to a multimode communication apparatus capable of conforming to a plurality of communication systems by varying its function.

BACKGROUND ART

With the spread of the radio communication system, plural radio communication systems having a different standard respectively are mixed together nowadays. The need for the multimode communication apparatus that is able to deal with plural radio communication systems singly is increased. Thus, the multimode communication apparatus equipped with the communication module whose function can be varied by software has been proposed as an approach. As the function-variable multimode communication apparatus in the prior art, there was the multimode communication apparatus that includes the resource in which functions of the communication apparatus are defined and is equipped with a signal processing device that is constructed to execute the necessary signal processing by using the resource and a controller that is used to redefine other modem functions and protocol functions in the resource (see Patent Literature 1, for example). FIG. 8 shows the conventional function-variable multimode communication apparatus set forth in above Patent Literature 1.

In FIG. 8, the conventional function-variable multimode communication apparatus (mobile radio communication apparatus) receives an RF signal from a base station via an antenna 601, and transmits the RF signal to the base station. A received signal from the antenna 601 is converted into a digital received IF signal by a radio transmitting/receiving device 602, and is supplied to a signal processing device 603. Then, a digital transmitted IF signal generated by the signal processing device 603 is converted in a transmitted RF signal by the radio transmitting/receiving device 602, and is supplied to the antenna 601.

The signal processing device 603 includes hardware resources such as a processor, a memory, a logic circuit, and the like integrated as an LSI, and executes mainly the processes necessary for the transmission/reception. The resource possessed by the signal processing device 603 is controlled by a resource controller 604. This control makes the mobile radio communication apparatus respond immediately to a change in its function or specification following upon a change in using conditions. Concretely, the resource controller 604 applies control to change the software, control to change the logic circuit constituting method, or both controls to the resource in the signal processing device 603, so that the function of the mobile radio communication apparatus can be varied to a desired function.

Software utilized by the signal processing device 603 and a database for process data, etc. are held in a memory device 605. The memory device 605 reads/writes necessary programs and data under control of the resource controller 604 or the system controller 606 that controls the overall inside of the mobile radio communication apparatus. The program read from the memory device 605 is described in the signal processing device 603. An input/output device unit 607 connected to the system controller 606 includes various input/output devices acting as the interface with the user of the mobile radio communication apparatus, e.g., a microphone, a speaker, a keyboard, a display, and the like.

Patent Literature 1: JP-A-2002-335186 (FIG. 1)

DISCLOSURE OF THE INVENTION

Problems that the Invention is to Solve

However, the configuration in the prior art has such a problem that, since the resource that the signal processing device possesses is controlled by the resource controller, the resource required for the resource controller as well as the hardware resource of the signal processing device is also needed.

The present invention has been made in view of the above circumstances, and it is an object of the present invention to provide a multimode communication apparatus capable of varying a function of a function-variable signal processing portion without external resource control, by introducing a resource controlling function into the signal processing portion not to provide a dedicated resource controlling portion.

Means for Solving the Problems

First, a multimode communication apparatus of the present invention includes a radio portion for conducting a radio communication; a plurality of signal processing devices capable of varying a function by resource control; and a storing portion for storing data that define a resource controlling function being executable on the plurality of signal processing devices; wherein the resource controlling function is furnished to at least any one of the plurality of signal processing devices.

According to the above configuration, the function of the signal processing portion can be varied not to provide the resource controlling portion to the outside of the signal processing portion, and also the resource controlling portion can be furnished into any signal processing device. Therefore, the function of the signal processing portion can be varied without external resource control.

Second, a multimode communication apparatus of the present invention includes a radio portion for conducting a radio communication; a plurality of signal processing devices capable of varying a function by resource control; and a storing portion for storing data that define a resource controlling function being executable on the plurality of signal processing devices; wherein the resource controlling function is divided into plural segments, and then the divided resource controlling function is furnished into at least any of the plurality of signal processing devices.

According to the above configuration, the function of the signal processing portion can be varied not to provide the resource controlling portion to the outside of the signal processing portion, and also the resource controlling portion can be furnished into any signal processing device. Therefore, the function of the signal processing portion can be varied without external resource control. Also, an amount of resource required from the particular signal processing device can be reduced by dividing the resource controlling function into plural segments, and also the resource controlling portion can be furnished into a plurality of signal processing devices that have resource to spare, in response to the amount of resource used in each signal processing device that is different according to the function.

Third, a multimode communication apparatus of the present invention includes a radio portion for conducting a radio communication; a plurality of signal processing devices capable of varying a function by resource control; and a storing portion for storing data that define a resource controlling function being executable on the plurality of signal processing devices; wherein the resource controlling function is divided into a resource deciding portion for deciding the signal processing device, into which the resource controlling function is furnished, by grasping a resource utilizing state of the signal processing devices, and a resource rewriting portion for executing a resource variation of the signal processing devices, and then the divided resource controlling function is furnished into at least any of the plurality of signal processing devices.

According to the above configuration, the function of the signal processing portion can be varied not to provide the resource controlling portion to the outside of the signal processing portion, and also the resource controlling portion can be furnished into any signal processing device. Therefore, the function of the signal processing portion can be varied without external resource control. Also, since the resource controlling portion is divided into a resource deciding portion and a resource rewriting portion while designating their functions, the resource controlling portion can be furnished into a plurality of signal processing devices that have resource to spare, in response to the amount of resource used in each signal processing device that is different according to the function.

Also, in the multimode communication apparatus of the present invention, the plurality of signal processing devices whose function can be varied is either of a program-operated type device and a logic definition type device.

According to the above configuration, since the program-operated type device such as DSP, or the like or the logic definition type device such as FPGA, or the like is used as the signal processing device, the function of the signal processing portion can be varied.

Also, in the multimode communication apparatus of the present invention, when the function of one signal processing device into which the resource controlling function is furnished is varied in the plurality of signal processing devices whose function can be varied, the function of an objective signal processing device is varied after the resource controlling function is shifted to other signal processing device.

According to the above configuration, the function of the objective signal processing portion is varied after the resource controlling function is shifted to other signal processing device. Therefore, the function can be varied without fail.

Also, in the multimode communication apparatus of the present invention, a data line that is shared with an overall system provided to the equipment is used as a route via which data that define functions of the signal processing devices containing the resource controlling function is supplied from the storing portion.

According to the above configuration, the function can be varied by supplying the data defining the function of the signal processing portion while using a data line that is shared with the overall system.

Also, in the multimode communication apparatus of the present invention, a common data line provided exclusively to vary the function is used as a route via which data that define functions of the signal processing devices containing the resource controlling function is supplied from the storing portion.

According to the above configuration, the function can be varied by supplying the data defining the function of the signal processing portion while using a common data line that is used exclusively to vary the function.

Also, in the multimode communication apparatus of the present invention, a data line provided to vary the function and connected exclusively between respective signal processing devices is used as a route via which data that define functions of the signal processing devices containing the resource controlling function is supplied from the storing portion.

According to the above configuration, the function can be varied by supplying the data defining the function of the signal processing portion while using a common data line that is connected exclusively between the signal processing devices.

Also, in the multimode communication apparatus of the present invention, the signal processing device into which the resource controlling function is furnished executes control of the radio portion.

According to the above configuration, the radio portion can be controlled by the signal processing device into which the resource controlling function is furnished, in response to the function definition state on the signal processing device.

Also, in the multimode communication apparatus of the present invention, as the signal processing device into which the resource controlling function is furnished, the signal processing device whose residual amount of resource after functions except the resource controlling function are defined is maximum is selected.

According to the above configuration, the signal processing device whose residual amount of resource after functions except the resource controlling function are defined is maximum is selected. Therefore, the resource controlling function can be furnished into the appropriate signal processing device.

Also, in the multimode communication apparatus of the present invention, as the signal processing device into which the resource controlling function is furnished, the signal processing device whose residual amount of resource is minimum is selected from the signal processing devices whose residual amount of resource after functions except the resource controlling function are defined is in excess of an amount of resource required to furnish the resource controlling function.

According to the above configuration, the signal processing device whose residual amount of resource is minimum is selected. Therefore, the resource controlling function can be furnished into the appropriate signal processing device.

Also, in the multimode communication apparatus of the present invention, as the signal processing device into which the resource controlling function is furnished, the signal processing device whose consumption power necessary for the action of the resource controlling function is minimum is selected from the signal processing devices whose residual amount of resource after the functions except the resource controlling function are defined is in excess of an amount of resource required to furnish the resource controlling function.

According to the above configuration, the signal processing device whose consumption power necessary for the action of the resource controlling function is minimum is selected. Therefore, the resource controlling function can be furnished into the appropriate signal processing device.

Also, in the multimode communication apparatus of the present invention, as the signal processing device into which the resource controlling function is furnished, the signal processing device whose variation in the residual amount of resource caused by the corresponding function variation is minimum is selected from the signal processing devices whose residual amount of resource after the functions except the resource controlling function are defined is in excess of an amount of resource required to furnish the resource controlling function.

According to the above configuration, the signal processing device whose variation in the residual amount of resource caused by the corresponding function variation is minimum is selected. Therefore, the resource controlling function can be furnished into the appropriate signal processing device.

Also, in the multimode communication apparatus of the present invention, as the signal processing device into which the resource controlling function is furnished, the signal processing device whose operating speed of the resource controlling function is maximum is selected from the signal processing devices whose residual amount of resource after the functions except the resource controlling function are defined is in excess of an amount of resource required to furnish the resource controlling function.

According to the above configuration, the signal processing device whose operating speed of the resource controlling function is maximum is selected. Therefore, the resource controlling function can be furnished into the appropriate signal processing device.

Also, in the multimode communication apparatus of the present invention, as the signal processing device into which the resource controlling function is furnished, the signal processing device whose predetermined priority is high is selected from the signal processing devices whose residual amount of resource after the functions except the resource controlling function are defined is in excess of an amount of resource required to furnish the resource controlling function.

According to the above configuration, the signal processing device whose predetermined priority is high is selected. Therefore, the resource controlling function can be furnished into the appropriate signal processing device.

Also, in the multimode communication apparatus of the present invention, a state where the resource controlling function is furnished into no signal processing device is set as an initial setting state, and the resource controlling function is furnished into a predetermined signal processing device in the initial setting state.

According to the above configuration, the resource controlling function can be furnished into the predetermined appropriate signal processing device in the initial setting state.

Also, the multimode communication apparatus of the present invention further includes a storing portion for storing a source code as an origin of data defining the resource controlling function instead of the data defining the resource controlling function; and a data generating portion for generating the data defining the resource controlling function from the source code; wherein, after the source code read from the storing portion is translated into the data defining the resource controlling function by the data generating portion, the resource controlling function is furnished into the plurality of signal processing devices.

According to the above configuration, the control data stored in the storing portion can be set identically irrespective of the signal processing device.

Also, in the multimode communication apparatus of the present invention, the data generating portion is furnished into the signal processing device.

According to the above configuration, there is no need to furnish the data generating portion independently.

Also, the multimode communication apparatus of the present invention further includes a storing portion for storing compressed definition data that is obtained by compressing the data defining the resource controlling function; and a data expanding portion for expanding/generating the data defining the resource controlling function from the compressed definition data; wherein, after the compressed definition data being read from the storing portion are expanded to the data defining the resource controlling function by the data expanding portion, the resource controlling function is furnished into the plurality of signal processing devices.

According to the above configuration, an amount of control data stored in the storing portion can be reduced, and a necessary capacity of the storing portion can be suppressed.

Also, in the multimode communication apparatus of the present invention, the data expanding portion is furnished into the signal processing device.

According to the above configuration, there is no need to furnish the data expanding portion independently.

Advantages of the Invention

According to the present invention, the multimode communication apparatus capable of varying a function of the function-variable signal processing portion without external resource control can be provided by introducing a resource controlling function into the signal processing portion not to provide a dedicated resource controlling portion.

Figure 1:
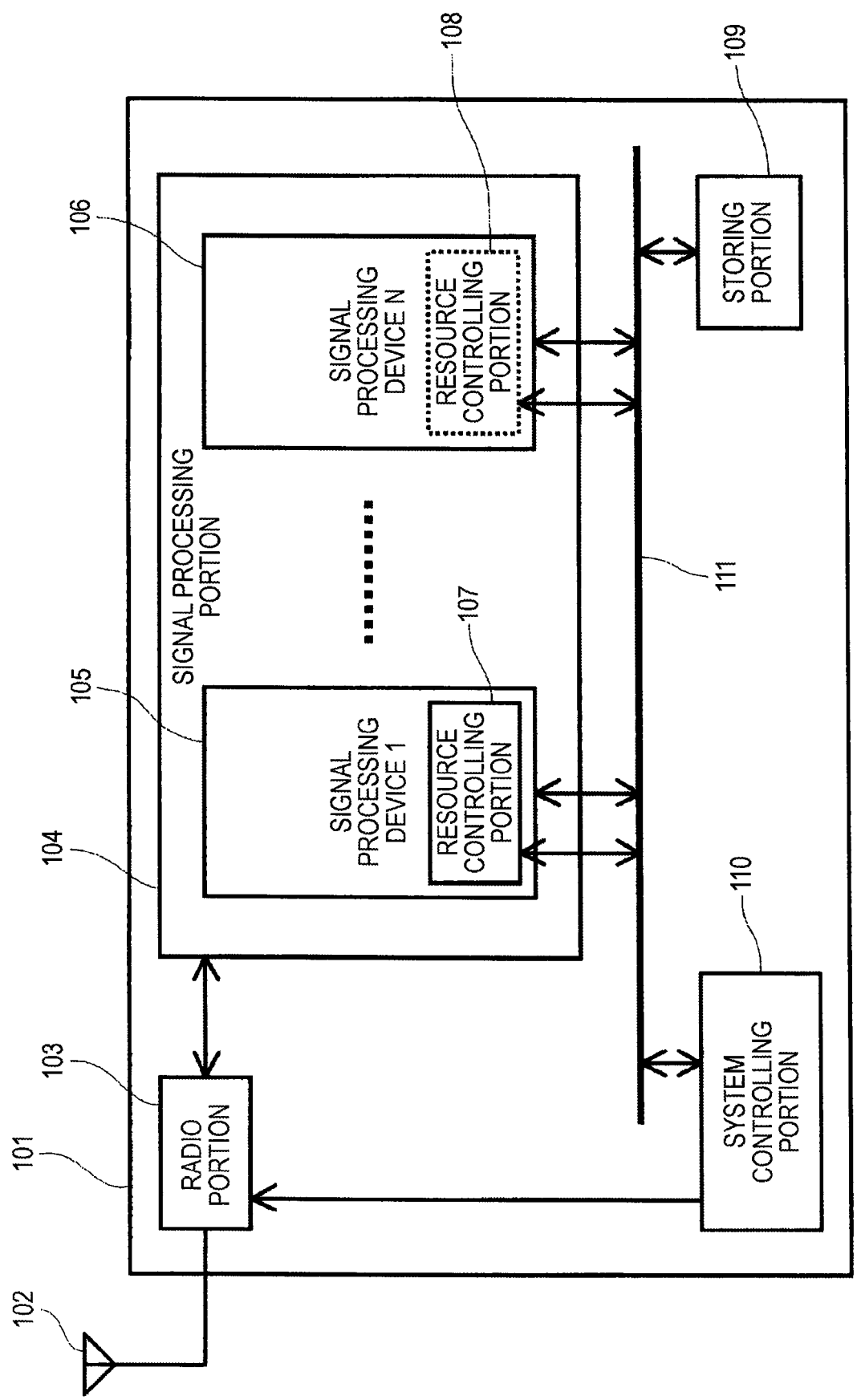
FIG. 1 A configurative view of a multimode communication apparatus according to a first embodiment of the present invention.

DESCRIPTION OF REFERENCE NUMERALS 101, 201, 301, 401, 501, 701, 801 multimode communication apparatus
102, 202, 302, 402, 502, 702, 802 antenna
103, 203, 303, 403, 503, 703, 803 radio portion
104, 204, 304, 404, 504, 704, 804 signal processing portion
105, 205, 305, 405, 505, 705, 805 first signal processing device
106, 206, 306, 406, 506, 706, 806 N-th signal processing device
107, 207, 307, 707, 807 resource controlling portion
108, 208, 308, 708, 808 resource controlling portion after moved
109, 209, 309, 409, 509, 709, 809 storing portion
110, 210, 310, 410, 510, 710, 810 system controlling portion
111 common data bus
211, 311, 411, 511, 711, 811 dedicated data bus for definition data
407 first resource controlling portion 408 second resource controlling portion
507 resource deciding portion
508 resource rewriting portion
712 data generating portion
812 data expanding portion

BEST MODE FOR CARRYING OUT THE INVENTION

First Embodiment

FIG. 1 is a configurative view of a multimode communication apparatus according to a first embodiment of the present invention.

A multimode communication apparatus 101 according to the first embodiment is constructed such that its function can be varied, and is equipped with an antenna 102 used to conduct a radio communication, a radio portion 103, and a signal processing portion 104 for executing mainly a base band signal processing. A system controlling portion 110 provided to control the overall system controls the overall operation of the multimode communication apparatus.

The signal processing portion 104 is constructed by a plurality of signal processing devices 105, 106. As respective signal processing devices 105, 106, there are the signal processing device such as CPU, DSP, or the like operated by program description, the signal processing device such as FPGA, or the like whose function is decided by the definition of the hardware resource, and the like.

Also, function definition data of the signal processing portion 104 are stored in a storing portion 109. Responding to the function required for the signal processing portion 104, the function definition data necessary for a plurality of signal processing devices 105, 106 constituting the signal processing portion 104 are supplied from the storing portion 109 to respective signal processing devices 105, 106 via a common data bus 111 that is a common data line of the overall system. Also, definition data of the resource controlling portion (resource controlling function), which are in the format that can be executed by respective signal processing devices 105, 106, are stored in the storing portion 109. In response to the function required for the signal processing portion 104, the storing portion 109 supplies the definition data of the resource controlling portion to the signal processing device, which has resource to spare, to furnish a function of a resource controlling portion 107.

As a concrete example, an operation taken when the function is changed from a system 1 to a system 2 on the assumption that the signal processing portion 104 having FPGA, which is a logic definition type device, as the first signal processing device 105 and DSP, which is a program-operated type device, as the second signal processing device 106 respectively is used and that GSM (Global System for Mobile Communications) is used as the system 1 and wireless LAN (Wireless Local Area Network) IEEE802.11a standard is used as the system 2 will be explained hereunder.

The GSM as the system 1 needs an equalizing process and a Viterbi decoding process in demodulation. Also, a modulation rate is 270.8 kbaud which is below 1 Mbaud. In view of the above conditions, this signal processing is suited to DSP (the second signal processing device 106) rather than FPGA (the first signal processing device 105). In contrast, the wireless LAN as the system 2 needs an FFT process that must be executed at 20 Msps. This signal processing is suited to FPGA (the first signal processing device 105) rather than DSP (the second signal processing device 106) because a high-speed signal processing carried out by a hardware circuit is required.

First, in a situation that the function of the system 1 is selected, the resource of the second signal processing device 106 is used much more because the function of the system 1 is the function that is fit to be accomplished by the second signal processing device 106. Therefore, the amount of resource used in the first signal processing device 105 is reduced. As a result, the definition data is supplied from the storing portion 109 to the first signal processing device 105 that has resource to spare, and then the function of the first resource controlling portion 107 is furnished.

Then, when the function is switched to the function of the system 2, the resource of the first signal processing device 105 is used much more because the function of the system 2 is the function that is fit to be accomplished by the first signal processing device 105. Therefore, the amount of resource used in the second signal processing device 106 is reduced. As a result, the definition data is supplied from the storing portion 109 to the second signal processing device 106 that has enough resource, and then the function of a second resource controlling portion 108 is furnished as the resource controlling portion after the switching.

At this time, in a situation that the function of the system 1 is selected, the first resource controlling portion 107 is effective and the second resource controlling portion 108 is not loaded. Therefore, when the function of the first signal processing device 105 is varied beforehand, such a problem is brought about that the resource control cannot be executed. In order to avoid this problem, first the function of the second resource controlling portion 108 is varied, then the control is shifted from the first resource controlling portion 107 to the second resource controlling portion 108 after the second resource controlling portion 108 after the switching is made effective, and then the function of the first signal processing device 105 is varied under control of the second resource controlling portion 108. When the function is varied from the system 2 to the system 1, a change in the function is carried out by the similar procedures while taking symmetry of the device into consideration.

According to a configuration and procedures in the above present embodiment, the overall resource control of the multimode communication apparatus 101 is never lost, so that the first resource controlling portion 107 is made effective in the case of the system 1 whereas the second resource controlling portion 108 is made effective in the case of the system 2. Also, in a state that no system is selected, i.e., in an initialized state where the resource controlling function is not furnished to any signal processing device, or when the overall resource controlling function of the multimode communication apparatus 101 is lost because of the drawback of any signal processing device, such an approach is available that, for example, the first signal processing device 105 is set in advance and then control of the signal processing portion 104 can be carried out by loading the first resource controlling portion 107 into the first signal processing device 105.

Therefore, the resource controlling portion can be furnished to the signal processing device, which has resource to spare, in answer to the amount of resource used in each signal processing device that is different according to the selected function. As a result, the function of the signal processing portion can be varied without the resource control applied from the external device.

In the present embodiment, the processing function of the communication system realized by the signal processing portion 104 is explained while taking the GSM and the wireless LAN as examples. Other communication systems may be employed, and the function of not only the physical layer but also the upper protocol or the application layer may be varied.

Also, an example where two signal processing devices are provided is explained. But the number of signal processing devices is not restricted to two, and any number may be employed if the number is plural.

Also, the signal processing devices are explained as the independent device. But the signal processing device may be provided to an inside of the same device if the resource control can be carried out independently.

Also, as the selecting reference of the signal processing device into which the resource controlling portion is furnished, it is selected whether or not the device has resource to spare. But any signal processing device may be selected if an amount of resource necessary for the furnishing of the resource controlling portion is still left therein. Also, the resource controlling portion may be furnished into any signal processing device if the above conditions are satisfied.

Examples of the method of selecting the signal processing device into which the resource controlling portion is furnished will be illustrated hereunder.

(1) As the signal processing device into which the resource controlling portion is furnished, the signal processing device whose residual amount of resource after the functions except the resource controlling function are defined is maximum is selected.

(2) As the signal processing device into which the resource controlling portion is furnished, the signal processing device whose residual amount of resource is minimum is selected from the signal processing devices whose residual amount of resource after the functions except the resource controlling function are defined is in excess of the amount of resource required to furnish the resource controlling function.

(3) As the signal processing device into which the resource controlling portion is furnished, the signal processing device whose consumption power necessary for the action of the resource controlling function is minimum is selected from the signal processing devices whose residual amount of resource after the functions except the resource controlling function are defined is in excess of the amount of resource required to furnish the resource controlling function.

(4) As the signal processing device into which the resource controlling portion is furnished, the signal processing device whose variation in the residual amount of resource caused by the corresponding function change is minimum is selected from the signal processing devices whose residual amount of resource after the functions except the resource controlling function are defined is in excess of the amount of resource required to furnish the resource controlling function.

(5) As the signal processing device into which the resource controlling portion is furnished, the signal processing device whose operating speed of the resource controlling function is maximum is selected from the signal processing devices whose residual amount of resource after the functions except the resource controlling function are defined is in excess of the amount of resource required to furnish the resource controlling function.

(6) As the signal processing device into which the resource controlling portion is furnished, the signal processing device whose predetermined priority is high is selected from the signal processing devices whose residual amount of resource after the functions except the resource controlling function are defined is in excess of the amount of resource required to furnish the resource controlling function.

According to such method of selecting the signal processing device, the resource controlling portion can be furnished into the proper signal processing device.

Second Embodiment

Figure 2:
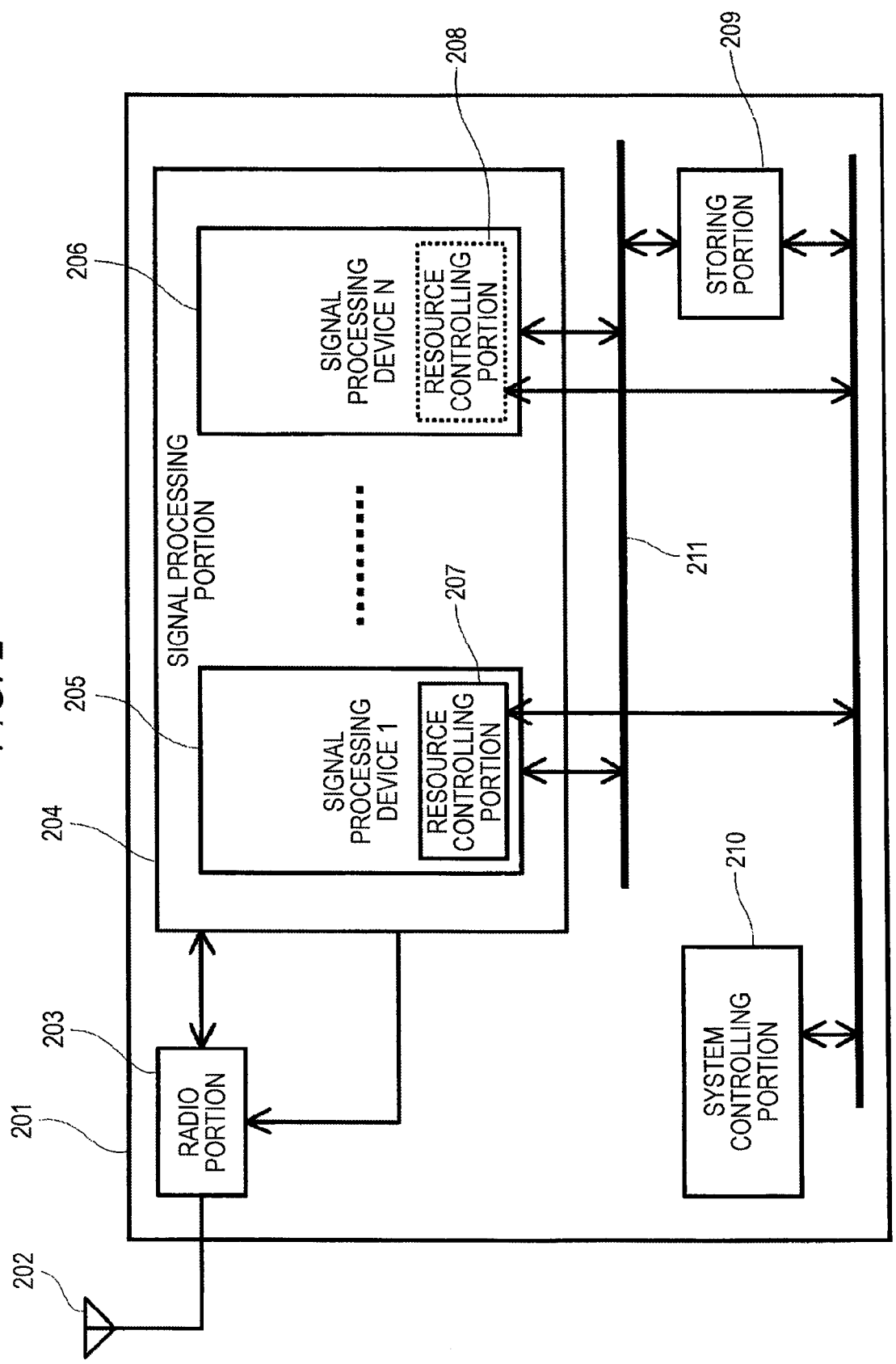
FIG. 2 A configurative view of a multimode communication apparatus according to a second embodiment of the present invention.

FIG. 2 is a configurative view of a multimode communication apparatus according to a second embodiment of the present invention.

A multimode communication apparatus 201 of the second embodiment is constructed such that its function can be varied, and includes an antenna 202 used to conduct a radio communication, a radio portion 203, and a signal processing portion 204 for executing mainly the base band signal processing. A system controlling portion 210 provided to control the overall system controls the overall operation of the multimode communication apparatus. The signal processing portion 204 is constructed by a plurality of signal processing devices 205, 206. Each configuration of the signal processing devices 205, 206 is similar to that in the first embodiment.

Also, the function definition data of the signal processing portion 204 is stored in a storing portion 209. Responding to the function required for the signal processing portion 204, the function definition data necessary for a plurality of signal processing devices 205, 206 constituting the signal processing portion 204 are supplied from the storing portion 209 to respective signal processing devices 205, 206 via a definition-data dedicated data bus 211 that is a common data line provided for the function variation use only. Also, definition data of the resource controlling portion, which have the executable format to respective signal processing portions, are stored in the storing portion 209. In response to the function required for the signal processing portion 204, the storing portion 209 supplies the definition data of the resource controlling portion to the signal processing device, which has resource to spare, to furnish a function of a resource controlling portion 207.

In the above configuration, the selected system and the procedures of selecting the signal processing device, in which the resource controlling portion is arranged, from the resources of the signal processing devices are similar to those in the first embodiment. Differences from the first embodiment reside in that the radio portion 203 is controlled by the signal processing portion 204 such that the radio portion 203 can be controlled in answer to the function definition state in the signal processing device and that the dedicated data bus 211 that supplies the function definition data and the definition data of the resource controlling portion from the storing portion 209 to respective signal processing devices 205, 206 is provided to avoid generation of the problem caused by the congestion of data buses.

Accordingly, in the second embodiment, the resource controlling portion can be furnished into the signal processing device, which has resource to spare, in response to the amount of resource used in the signal processing device that is different by the selected function. Therefore, the function of the signal processing portion can be varied without resource control applied from the external device.

In this case, respective configurations used to control the radio portion 203 by the signal processing portion 204 and to provide the dedicated data bus that supplies the function definition data and the definition data of the resource controlling portion from the storing portion 209 to respective signal processing devices may be embodied independently.

Third Embodiment

Figure 3:
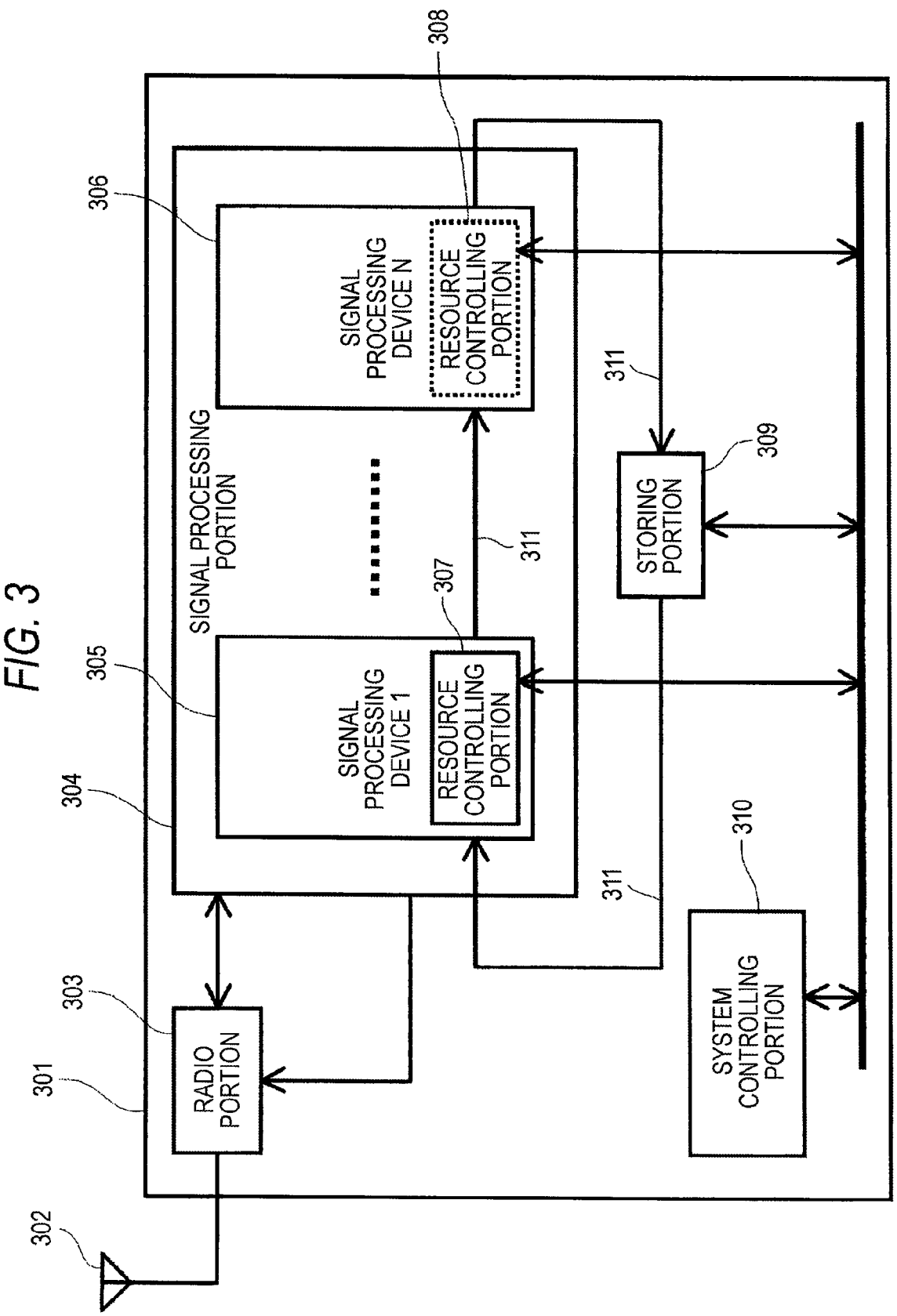
FIG. 3 A configurative view of a multimode communication apparatus according to a third embodiment of the present invention.

FIG. 3 is a configurative view of a multimode communication apparatus according to a third embodiment of the present invention.

A multimode communication apparatus 301 of the third embodiment is constructed such that its function can be varied, and includes an antenna 302 used to conduct a radio communication, a radio portion 303, and a signal processing portion 304 for executing mainly the base band signal processing. A system controlling portion 310 provided to control the overall system controls the overall operation of the multimode communication apparatus. The signal processing portion 304 is constructed by a plurality of signal processing devices 305, 306. Each configuration of the signal processing devices 305, 306 is similar to that in the first embodiment.

Also, the function definition data of the signal processing portion 304 is stored in a storing portion 309. Responding to the function required for the signal processing portion 304, the function definition data necessary for a plurality of signal processing devices 305, 306 constituting the signal processing portion 304 are supplied from the storing portion 309 to respective signal processing devices via definition-data dedicated data buses 311 that are data lines connected exclusively between the storing portion 209 and respective signal processing devices. The dedicated data buses 311 are constructed to chain the storing portion 309 and respective signal processing devices 305, 306 in a row sequentially. This is normally called the daisy-chain connection. Also, definition data of the resource controlling portion, which have the format that can be executed by respective signal processing portions, are stored in the storing portion 309. In response to the function required for the signal processing portion 304, the storing portion 309 supplies the definition data of the resource controlling portion to the signal processing device, which has enough resource, to furnish a function of a resource controlling portion 307.

In the above configuration, the selected system and the procedures of selecting the signal processing device, in which the resource controlling portion is arranged, from the resources of the signal processing devices are similar to those in the second embodiment. A difference from the second embodiment is that the dedicated data buses are provided as the daisy-chain connection.

Accordingly, in the third embodiment, the resource controlling portion can be furnished into the signal processing device, which has resource to spare, in response to the amount of resource used in the signal processing device that is different by the selected function. Therefore, the function of the signal processing portion can be varied without external resource control.

In this case, respective configurations used to control the radio portion 303 by the signal processing portion 304 and to provide the dedicated data bus that supplies the function definition data and the definition data of the resource controlling portion from the storing portion 309 to respective signal processing devices may be embodied independently.

Fourth Embodiment

Figure 4:
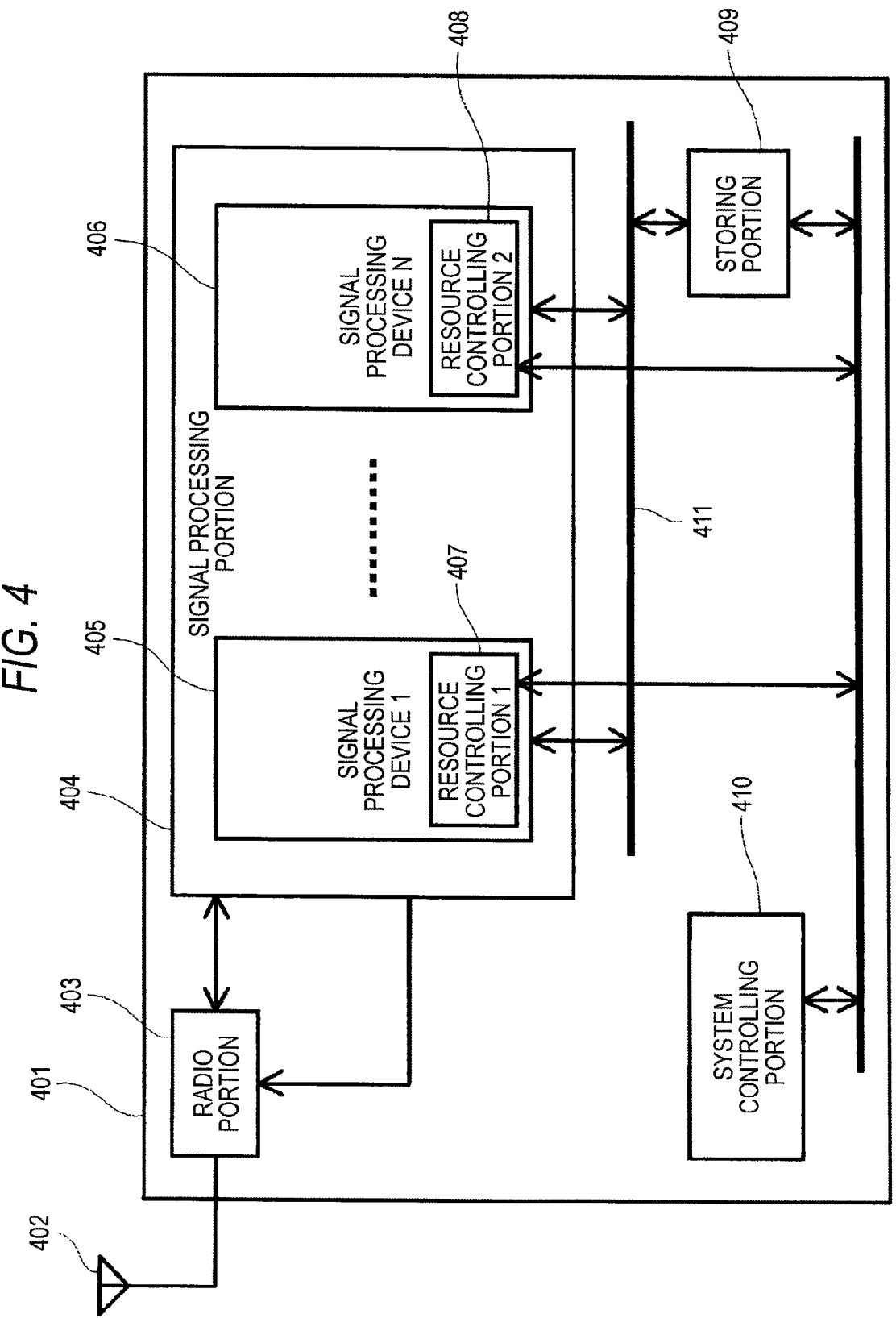
FIG. 4 A configurative view of a multimode communication apparatus according to a fourth embodiment of the present invention.

FIG. 4 is a configurative view of a multimode communication apparatus according to a fourth embodiment of the present invention.

A multimode communication apparatus 401 of the fourth embodiment is constructed such that its function can be varied, and includes an antenna 402 used to conduct a radio communication, a radio portion 403, and a signal processing portion 404 for executing mainly the base band signal processing. A system controlling portion 410 provided to control the overall system controls the overall operation of the multimode communication apparatus. The signal processing portion 404 is constructed by a plurality of signal processing devices 405, 406. Each configuration of the signal processing devices 405, 406 is similar to that in the first embodiment.

Also, the function definition data of the signal processing portion 404 is stored in a storing portion 409. Responding to the function required for the signal processing portion 404, the function definition data necessary for a plurality of signal processing devices 405, 406 constituting the signal processing portion 404 are supplied from the storing portion 409 to respective signal processing devices 405, 406 via a definition-data dedicated data bus 411. Also, definition data of the resource controlling portion, which have the format that can be executed by respective signal processing portions, are stored in the storing portion 409. In response to the function required for the signal processing portion 404, the storing portion 409 supplies the definition data of the resource controlling portion to a plurality of signal processing devices, which have enough resource, to furnish respective functions of a first resource controlling portion 407 and a second resource controlling portion 408.

In the above configuration, the selected system and the procedures of selecting the signal processing device, in which the resource controlling portion is arranged, from the resources of the signal processing devices are similar to those in the second embodiment. A difference from the second embodiment is that the resource controlling portion is divided and furnished into two signal processing devices and thus the amount of resource required for a particular signal processing device can be reduced.

Accordingly, in the fourth embodiment, the resource controlling portion can be furnished into a plurality of signal processing devices, which have resource to spare, in response to the amount of resource used in the signal processing device that is different by the selected function. Therefore, the function of the signal processing portion can be varied without external resource control.

In this case, the split number of resource controlling portions is not limited to two, and may be varied. The number may be set arbitrarily within a range that comes up to a total number of the signal processing devices.

Fifth Embodiment

Figure 5:
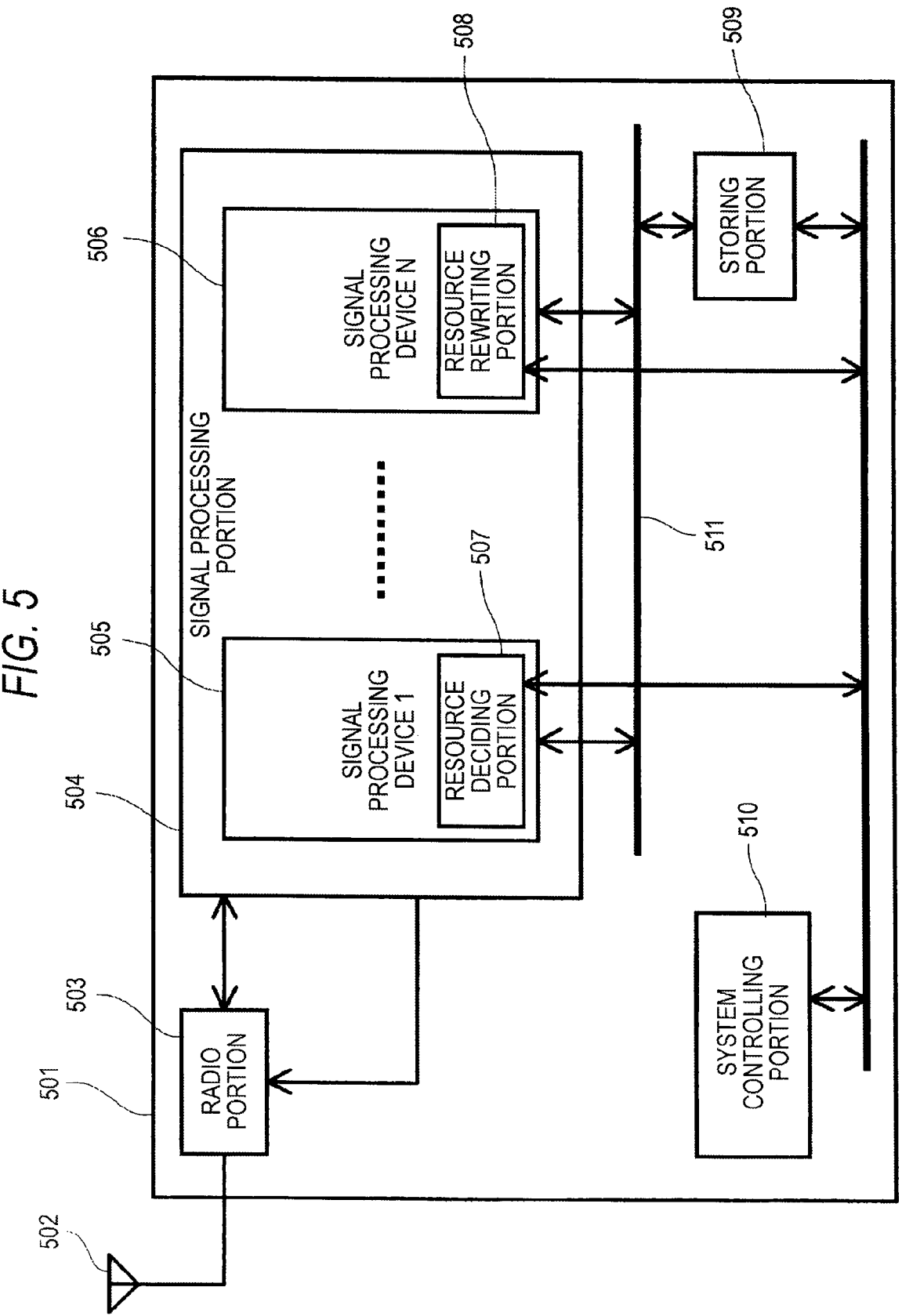
FIG. 5 A configurative view of a multimode communication apparatus according to a fifth embodiment of the present invention.

FIG. 5 is a configurative view of a multimode communication apparatus according to a fifth embodiment of the present invention.

A multimode communication apparatus 501 of the fifth embodiment includes an antenna 502 used to conduct a radio communication, a radio portion 503, and a signal processing portion 504 for executing mainly the base band signal processing. A system controlling portion 510 provided to control the overall system controls the overall operation of the multimode communication apparatus. The signal processing portion 504 is constructed by a plurality of signal processing devices 505, 506. Each configuration of the signal processing devices 505, 506 is similar to that in the first embodiment.

Also, the function definition data of the signal processing portion 504 is stored in a storing portion 509. Responding to the function required for the signal processing portion 504, the function definition data necessary for a plurality of signal processing devices constituting the signal processing portion 504 are supplied from the storing portion 509 to respective signal processing devices 505, 506 via a definition-data dedicated data bus 511. Also, definition data of the resource controlling portion, which have the format that can be executed by respective signal processing portions, are stored in the storing portion 509. In response to the function required for the signal processing portion 504, the storing portion 509 supplies definition data of a resource deciding portion and definition data of a resource rewriting portion to a plurality of signal processing devices, which have enough resource, to furnish respective functions of a resource deciding portion 507 and a resource rewriting portion 508.

In the above configuration, the selected system and the procedures of selecting the signal processing device, in which the resource controlling portion is arranged, from the resources of the signal processing devices are similar to those in the fourth embodiment. A difference from the fourth embodiment is that the resource controlling portion is divided into the resource deciding portion 507 and the resource rewriting portion 508 while designating their functions.

Accordingly, in the fifth embodiment, the resource controlling portion can be furnished into a plurality of signal processing devices, which have resource to spare, in response to the amount of resource used in the signal processing device that is different by the selected function. Therefore, the function of the signal processing portion can be varied without external resource control.

In this case, the split number of resource controlling portions is not limited to two, and may be varied. The number may be set arbitrarily within a range that comes up to a total number of the signal processing devices. When the resource controlling portion is divided into three segments or more, the resource deciding portion 507 and the resource rewriting portion 508 are further divided correspondingly.

Sixth Embodiment

Figure 6:
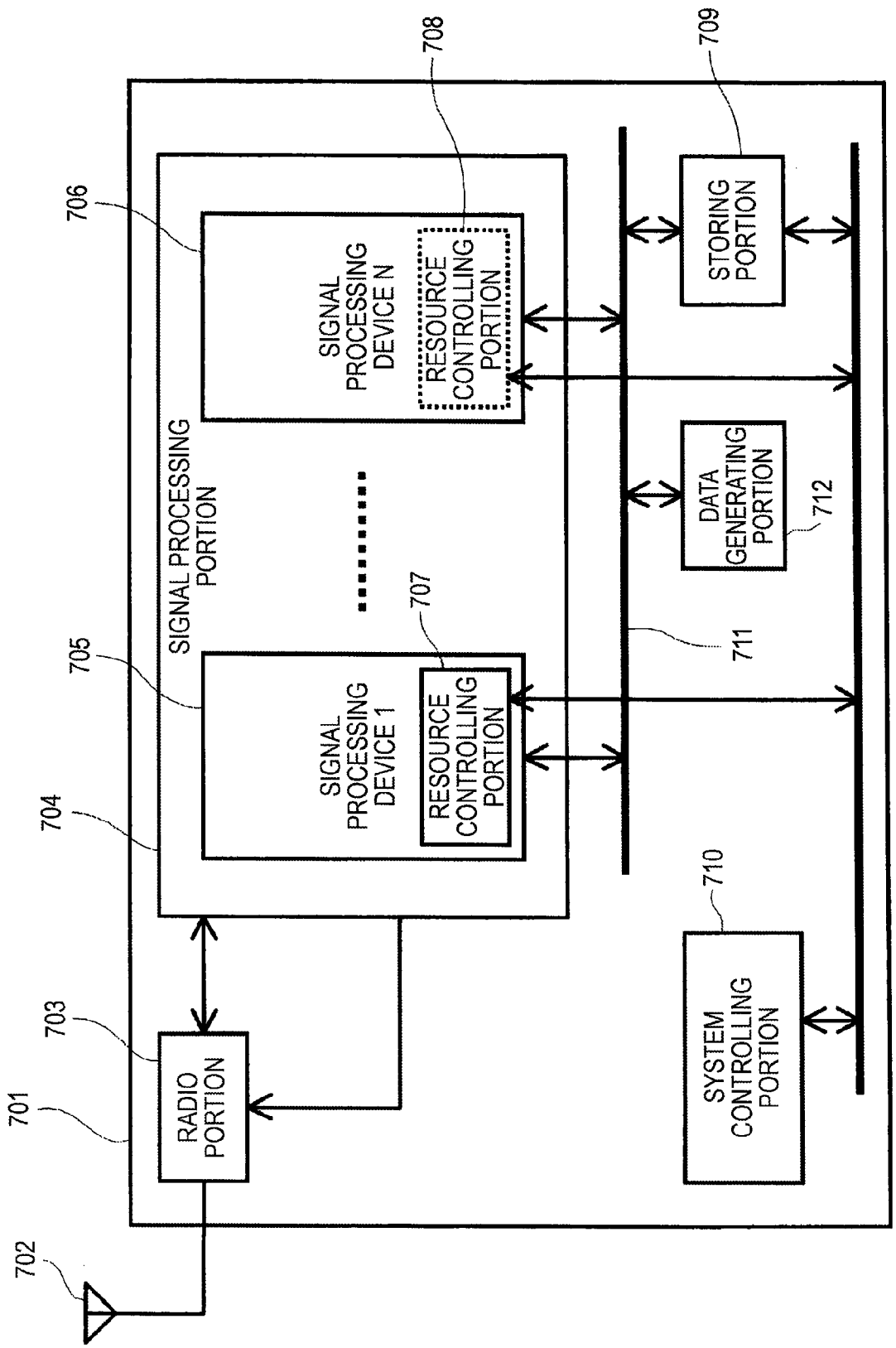
FIG. 6 A configurative view of a multimode communication apparatus according to a sixth embodiment of the present invention.

FIG. 6 is a configurative view of a multimode communication apparatus according to a sixth embodiment of the present invention.

A multimode communication apparatus 701 of the sixth embodiment is constructed such that its function can be varied, and includes an antenna 702 used to conduct a radio communication, a radio portion 703, and a signal processing portion 704 for executing mainly the base band signal processing. A system controlling portion 710 provided to control the overall system controls the overall operation of the multimode communication apparatus. The signal processing portion 704 is constructed by a plurality of signal processing devices 705, 706. Each configuration of the signal processing devices 705, 706 is similar to that in the first embodiment.

Also, the function definition data of the signal processing portion 704 is stored in the source code format in a storing portion 709. Responding to the function required for the signal processing portion 704, the source codes of the function definition data necessary for a plurality of signal processing devices 705, 706 constituting the signal processing portion 704 are input into a data generating portion 712 from the storing portion 709 via a definition-data dedicated data bus 711 that is a common data line provided exclusively to vary the function. The function definition data necessary for respective signal processing devices 705, 706 are generated in the data generating portion 712 from the input source code, and are supplied to respective signal processing devices 705, 706 via definition-data dedicated data bus 711. Also, definition data of the resource controlling portion, which have the format that can be executed by respective signal processing portions, are stored in the storing portion 409. In response to the function required for the signal processing portion 704, the definition data of the resource controlling portion generated by the data generating portion 712 are supplied to the signal processing device, which has resource to spare, to furnish a function of a resource controlling portion 707.

In the above configuration, the selected system and the procedures of selecting the signal processing device, in which the resource controlling portion is arranged, from the resources of the signal processing devices are similar to those in the second embodiment. A difference from the second embodiment is that the data generating portion is provided and also the function definition data of the signal processing portion and the definition data of the resource controlling portion, which are stored in the storing portion 709, are provided in the source code format that does not depends on the signal processing device.

Therefore, in the sixth embodiment, if the data generating portion corresponds to the signal processing portion, the function definition data of the signal processing portion and the definition data of the resource controlling portion can be stored in the storing portion in the identical source code format irrespective of the type of the signal processing device to be furnished. As a result, even when the signal processing device is varied, there is no need to vary the function definition data and the definition data of the resource controlling portion stored in the storing portion.

In this case, the data generating portion 712 may be furnished to one signal processing device or more instead of the external portion. Also, the data generating portion 712 may be furnished exclusively to each signal processing device independently.

Also, it may be carried out independently to store the function definition data of the signal processing portion and the definition data of the resource controlling portion in the storing portion in the identical source code format respectively.

Seventh Embodiment

Figure 7:
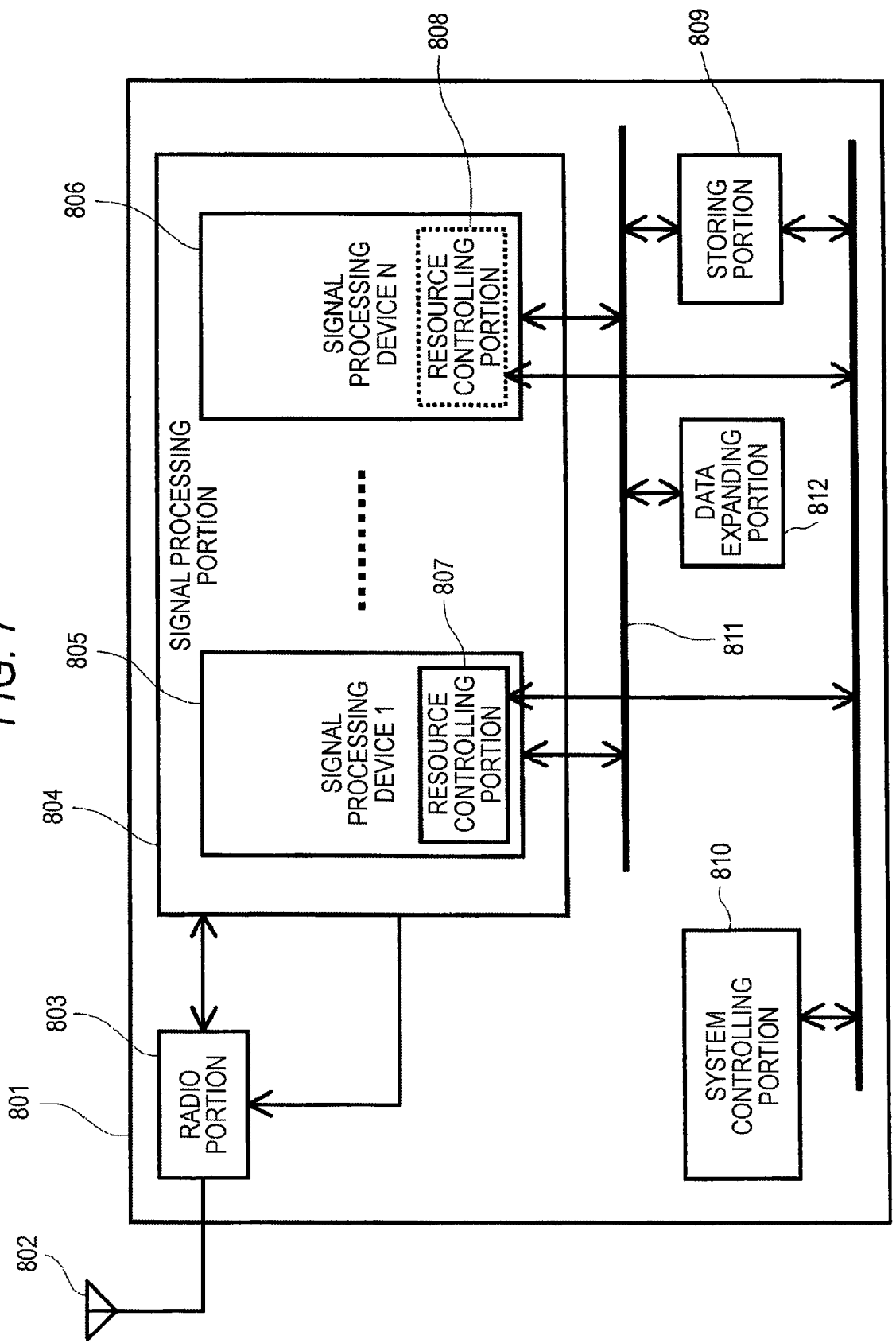
FIG. 7 A configurative view of a multimode communication apparatus according to a seventh embodiment of the present invention.
Figure 8:
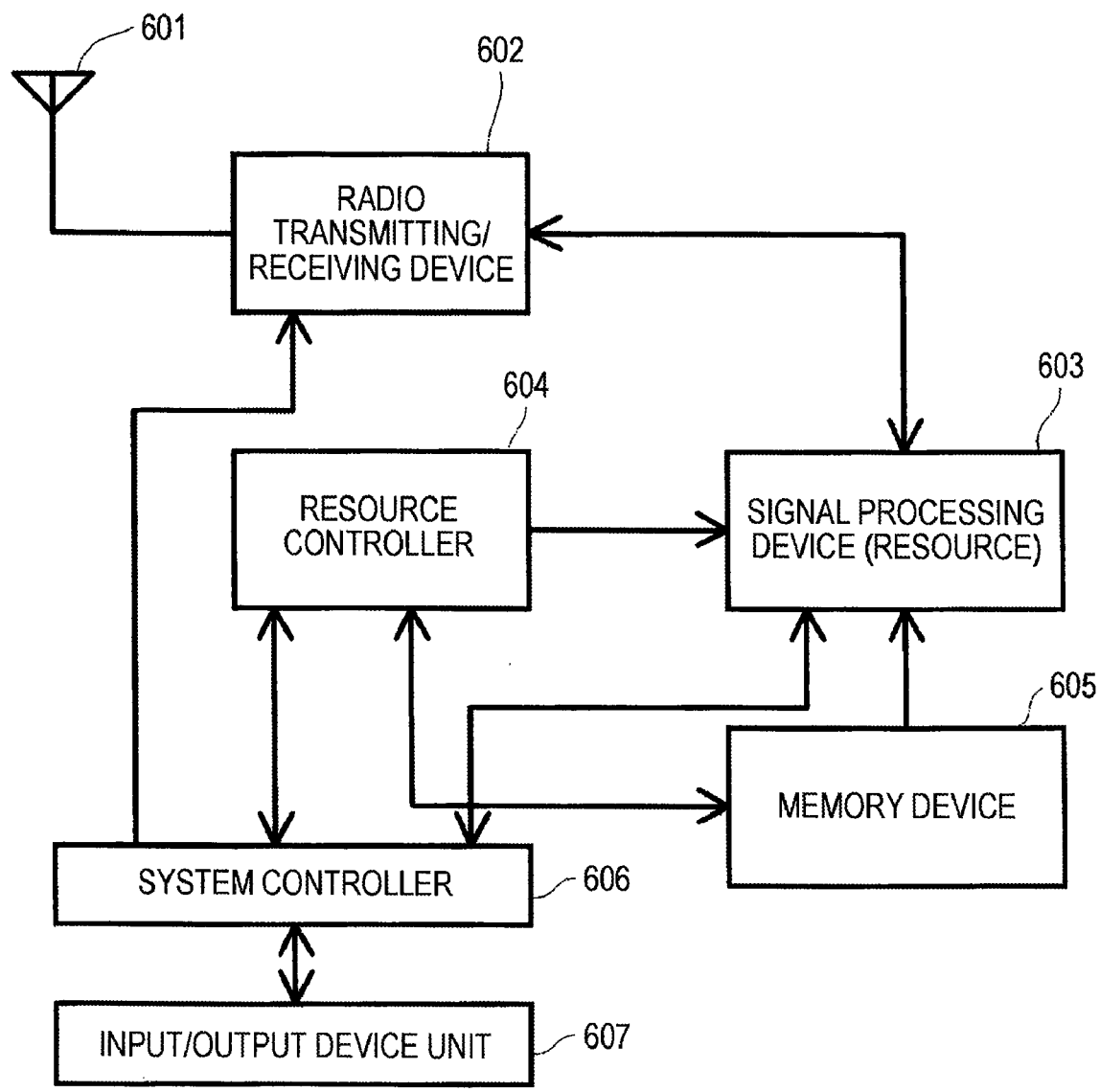
FIG. 8 A configurative view of a function-variable multimode communication apparatus in the prior art.

FIG. 7 is a configurative view of a multimode communication apparatus according to a seventh embodiment of the present invention.

A multimode communication apparatus 801 of the seventh embodiment is constructed such that its function can be varied, and includes an antenna 802 used to conduct a radio communication, a radio portion 803, and a signal processing portion 804 for executing mainly the base band signal processing. A system controlling portion 810 provided to control the overall system controls the overall operation of the multimode communication apparatus. The signal processing portion 804 is constructed by a plurality of signal processing devices 805, 806. Each configuration of the signal processing devices 805, 806 is similar to that in the first embodiment.

Also, the function definition data of the signal processing portion 804 is stored in a storing portion 809 in the compressed format. Responding to the function required for the signal processing portion 804, compressed data of the function definition data necessary for a plurality of signal processing devices 805, 806 constituting the signal processing portion 804 are input into a data expanding portion 812 from the storing portion 809 via a definition-data dedicated data bus 811 that is a common data line provided for the function switch use only. The data expanding portion 812 expands the input compressed data to the function definition data necessary for the signal processing devices 805, 806, and then supplies the data to respective signal processing devices 805, 806 via the definition-data dedicated data bus 811. Also, definition data of the resource controlling portion, which have the executable format to respective signal processing portions, are stored in the compressed format in the storing portion 809. In response to the function required for the signal processing portion 804, the definition data of the resource controlling portion expanded in the data expanding portion 812 are supplied to the signal processing device, which has resource to spare, to furnish a function of a resource controlling portion 807.

In the above configuration, the selected system and the procedures of selecting the signal processing device, in which the resource controlling portion is arranged, from the resources of the signal processing devices are similar to those in the second embodiment. Differences from the second embodiment reside in that the data expanding portion is provided and also the data stored in the storing portion is provided in the compressed format.

Therefore, in the seventh embodiment, the data compressed in the format corresponding to the data expanding portion can be stored in the storing portion. As a result, an amount of data to be stored in the storing portion can be reduced.

In this case, the data expanding portion 812 may be furnished to one signal processing device or more instead of the external portion. Also, the data expanding portion 812 may be furnished exclusively to each signal processing device independently.

Also, it may be carried out independently to store the function definition data of the signal processing portion and the definition data of the resource controlling portion in the storing portion in the compressed format respectively.

According to the above multimode communication apparatus of the present embodiment, a plurality of signal processing devices can be rewritten without external resource control not to provide the dedicated resource controlling portion for the function variation to the radio communication apparatus, and thus the function of the signal processing device can be varied. Therefore, since an advantage of reducing the resource of the overall communication apparatus can be expected, the present embodiment is useful to the multimode radio set used in the mobile communication, for example, and the like. Also, the present embodiment can be applied to the applications of the home radio network system in which plural communication systems are mixedly used, and the like.

The present invention is explained in detail with reference to particular embodiments. But it is obvious for those skilled in the art that various variation and modifications can be applied without departing from a spirit and a scope of the present invention.

This application is based upon Japanese Patent Application (Patent Application No. 2005-039191) filed on Feb. 16, 2005, and Japanese Patent Application (Patent Application No. 2005-225385) filed on Aug. 3, 2005; the contents of which are incorporated herein by reference.

INDUSTRIAL APPLICABILITY

The present invention possesses such an advantage that a function of the function-variable signal processing portion can be varied without external resource control by introducing a resource controlling function into the signal processing portion not to provide a dedicated resource controlling portion, and is useful to the multimode communication apparatus that can conform to a plurality of communication systems by varying its function, or the like.

The invention claimed is:

1. A multimode communication apparatus, comprising:
a radio portion that conducts a radio communication;
a plurality of signal processing devices capable of varying a function by resource control;
a storing portion that stores data which define a resource controlling function being executable on the plurality of signal processing devices, wherein the storing portion stores compressed definition data which is obtained by compressing the data which define the resource controlling function, and
a data expanding portion that expands/generates the data which define the resource controlling function from the compressed definition data,
wherein the resource controlling function is furnished to at least any one of the plurality of signal processing devices, and
wherein, after the compressed definition data being read from the storing portion are expanded to the data which define the resource controlling function by the data expanding portion, the resource controlling function is furnished into the plurality of signal processing devices.

2. The multimode communication apparatus, according to claim 1, wherein the plurality of signal processing devices whose function can be varied are either of program-operated type devices and logic definition type devices.

3. The multimode communication apparatus, according to claim 1, wherein a data line which is shared with an overall system provided to the apparatus is used as a route via which data which define functions of the signal processing devices containing the resource controlling function is supplied from the storing portion.

4. The multimode communication apparatus, according to claim 1, wherein a common data line provided exclusively to vary the function is used as a route via which data which define functions of the signal processing devices containing the resource controlling function is supplied from the storing portion.

5. The multimode communication apparatus, according to claim 1, wherein a data line provided to vary the function and connected exclusively between respective signal processing devices is used as a route via which data which define functions of the signal processing devices containing the resource controlling function is supplied from the storing portion.

6. The multimode communication apparatus, according to claim 1, wherein the signal processing device into which the resource controlling function is furnished executes control of the radio portion.

7. The multimode communication apparatus, according to claim 1, wherein, as the signal processing device into which the resource controlling function is furnished, the signal processing device, whose residual amount of resource after functions except the resource controlling function are defined is maximum, is selected.

8. The multimode communication apparatus, according to claim 1, wherein, as the signal processing device into which the resource controlling function is furnished, the signal processing device whose residual amount of resource is minimum is selected from the signal processing devices whose residual amount of resource after functions except the resource controlling function are defined is in excess of an amount of resource required to furnish the resource controlling function.

9. The multimode communication apparatus, according to claim 1, wherein, as the signal processing device into which the resource controlling function is furnished, the signal processing device whose consumption power necessary for the action of the resource controlling function is minimum is selected from the signal processing devices whose residual amount of resource after the functions except the resource controlling function are defined is in excess of an amount of resource required to furnish the resource controlling function.

10. The multimode communication apparatus, according to claim 1, wherein, as the signal processing device into which the resource controlling function is furnished, the signal processing device whose variation in the residual amount of resource caused by the corresponding function variation is minimum is selected from the signal processing devices whose residual amount of resource after the functions except the resource controlling function are defined is in excess of an amount of resource required to furnish the resource controlling function.

11. The multimode communication apparatus, according to claim 1, wherein, as the signal processing device into which the resource controlling function is furnished, the signal processing device whose operating speed of the resource controlling function is maximum is selected from the signal processing devices whose residual amount of resource after the functions except the resource controlling function are defined is in excess of an amount of resource required to furnish the resource controlling function.

12. The multimode communication apparatus, according to claim 1, wherein, as the signal processing device into which the resource controlling function is furnished, the signal processing device whose predetermined priority is high is selected from the signal processing devices whose residual amount of resource after the functions except the resource controlling function are defined is in excess of an amount of resource required to furnish the resource controlling function.

13. The multimode communication apparatus, according to claim 1, wherein a state where the resource controlling function is furnished into no signal processing device is set as an initial setting state, and the resource controlling function is furnished into a predetermined signal processing device in the initial setting state.

14. The multimode communication apparatus, according to claim 1, further comprising:
a storing portion that stores a source code as an origin of data defining the resource controlling function instead of the data defining the resource controlling function; and
a data generating portion that generates the data defining the resource controlling function from the source code;
wherein, after the source code read from the storing portion is translated into the data defining the resource controlling function by the data generating portion, the resource controlling function is furnished into the plurality of signal processing devices.

15. The multimode communication apparatus, according to claim 14, wherein the data generating portion is furnished into the signal processing device.

16. The multimode communication apparatus, according to claim 1, wherein, when the function of one signal processing device into which the resource controlling function is furnished is varied in the plurality of signal processing devices whose function can be varied, the function of an objective signal processing device is varied after the resource controlling function is shifted to an other signal processing device.

17. The multimode communication apparatus, according to claim 1, wherein the data expanding portion is furnished into the signal processing device.

18. A multimode communication apparatus, comprising:
a radio portion that conducts a radio communication;
a plurality of signal processing devices capable of varying a function by resource control;
a storing portion that stores data which define a resource controlling function being executable on the plurality of signal processing devices, wherein the storing portion stores compressed definition data which is obtained by compressing the data which define the resource controlling function, and
a data expanding portion that expands/generates the data which define the resource controlling function from the compressed definition data,
wherein the resource controlling function is divided into plural segments, and the divided resource controlling functions are furnished into at least any of the plurality of signal processing devices, and
wherein, after the compressed definition data being read from the storing portion are expanded to the data which define the resource controlling function by the data expanding portion, the resource controlling function is furnished into the plurality of signal processing devices.

19. The multimode communication apparatus, according to claim 18, wherein the plurality of signal processing devices whose function can be varied are either of program-operated type devices and logic definition type devices.

20. The multimode communication apparatus, according to claim 18, wherein a data line which is shared with an overall system provided to the apparatus is used as a route via which data which define functions of the signal processing devices containing the resource controlling function is supplied from the storing portion.

21. The multimode communication apparatus, according to claim 18, wherein a common data line provided exclusively to vary the function is used as a route via which data which define functions of the signal processing devices containing the resource controlling function is supplied from the storing portion.

22. The multimode communication apparatus, according to claim 18, wherein a data line provided to vary the function and connected exclusively between respective signal processing devices is used as a route via which data which define functions of the signal processing devices containing the resource controlling function is supplied from the storing portion.

23. The multimode communication apparatus, according to claim 18, wherein the signal processing device into which the resource controlling function is furnished executes control of the radio portion.

24. The multimode communication apparatus, according to claim 18, wherein, as the signal processing device into which the resource controlling function is furnished, the signal processing device, whose residual amount of resource after functions except the resource controlling function are defined is maximum, is selected.

25. The multimode communication apparatus, according to claim 18, wherein, as the signal processing device into which the resource controlling function is furnished, the signal processing device whose residual amount of resource is minimum is selected from the signal processing devices whose residual amount of resource after functions except the resource controlling function are defined is in excess of an amount of resource required to furnish the resource controlling function.

26. The multimode communication apparatus, according to claim 18, wherein, as the signal processing device into which the resource controlling function is furnished, the signal processing device whose consumption power necessary for the action of the resource controlling function is minimum is selected from the signal processing devices whose residual amount of resource after the functions except the resource controlling function are defined is in excess of an amount of resource required to furnish the resource controlling function.

27. The multimode communication apparatus, according to claim 18, wherein, as the signal processing device into which the resource controlling function is furnished, the signal processing device whose variation in the residual amount of resource caused by the corresponding function variation is minimum is selected from the signal processing devices whose residual amount of resource after the functions except the resource controlling function are defined is in excess of an amount of resource required to furnish the resource controlling function.

28. The multimode communication apparatus, according to claim 18, wherein, as the signal processing device into which the resource controlling function is furnished, the signal processing device whose operating speed of the resource controlling function is maximum is selected from the signal processing devices whose residual amount of resource after the functions except the resource controlling function are defined is in excess of an amount of resource required to furnish the resource controlling function.

29. The multimode communication apparatus, according to claim 18, wherein, as the signal processing device into which the resource controlling function is furnished, the signal processing device whose predetermined priority is high is selected from the signal processing devices whose residual amount of resource after the functions except the resource controlling function are defined is in excess of an amount of resource required to furnish the resource controlling function.

30. The multimode communication apparatus, according to claim 18, wherein a state where the resource controlling function is furnished into no signal processing device is set as an initial setting state, and the resource controlling function is furnished into a predetermined signal processing device in the initial setting state.

31. The multimode communication apparatus, according to claim 18, further comprising:
a storing portion that stores a source code as an origin of data defining the resource controlling function instead of the data defining the resource controlling function; and
a data generating portion that generates the data defining the resource controlling function from the source code;
wherein, after the source code read from the storing portion is translated into the data defining the resource controlling function by the data generating portion, the resource controlling function is furnished into the plurality of signal processing devices.

32. The multimode communication apparatus, according to claim 31, wherein the data generating portion is furnished into the signal processing device.

33. The multimode communication apparatus, according to claim 18, wherein the data expanding portion is furnished into the signal processing device.

34. The multimode communication apparatus, according to claim 18, wherein, when the function of one signal processing device into which the resource controlling function is furnished is varied in the plurality of signal processing devices whose function can be varied, the function of an objective signal processing device is varied after the resource controlling function is shifted to an other signal processing device.

35. A multimode communication apparatus, comprising:
a radio portion that conducts a radio communication;
a plurality of signal processing devices capable of varying a function by resource control;
a storing portion that stores data which define a resource controlling function being executable on the plurality of signal processing devices, wherein the storing portion stores compressed definition data which is obtained by compressing the data which define the resource controlling function, and
a data expanding portion that expands/generates the data which define the resource controlling function from the compressed definition data,
wherein the resource controlling function is divided into a resource deciding portion for deciding the signal processing device, into which the resource controlling function is furnished, by grasping a resource utilizing state of the signal processing devices, and a resource rewriting portion for executing a resource variation of the signal processing devices, and the divided resource controlling function is furnished into at least any of the plurality of signal processing devices, and
wherein, after the compressed definition data being read from the storing portion are expanded to the data which define the resource controlling function by the data expanding portion, the resource controlling function is furnished into the plurality of signal processing devices.

36. The multimode communication apparatus, according to claim 35, wherein the plurality of signal processing devices whose function can be varied are either of program-operated type devices and logic definition type devices.

37. The multimode communication apparatus, according to claim 35, wherein a data line which is shared with an overall system provided to the apparatus is used as a route via which data which define functions of the signal processing devices containing the resource controlling function is supplied from the storing portion.

38. The multimode communication apparatus, according to claim 35, wherein a common data line provided exclusively to vary the function is used as a route via which data which define functions of the signal processing devices containing the resource controlling function is supplied from the storing portion.

39. The multimode communication apparatus, according to claim 35, wherein a data line provided to vary the function and connected exclusively between respective signal processing devices is used as a route via which data which define functions of the signal processing devices containing the resource controlling function is supplied from the storing portion.

40. The multimode communication apparatus, according to claim 35, wherein the signal processing device into which the resource controlling function is furnished executes control of the radio portion.

41. The multimode communication apparatus, according to claim 35, wherein, as the signal processing device into which the resource controlling function is furnished, the signal processing device, whose residual amount of resource after functions except the resource controlling function are defined is maximum, is selected.

42. The multimode communication apparatus, according to claim 35, wherein, as the signal processing device into which the resource controlling function is furnished, the signal processing device whose residual amount of resource is minimum is selected from the signal processing devices whose residual amount of resource after functions except the resource controlling function are defined is in excess of an amount of resource required to furnish the resource controlling function.

43. The multimode communication apparatus, according to claim 35, wherein, as the signal processing device into which the resource controlling function is furnished, the signal processing device whose consumption power necessary for the action of the resource controlling function is minimum is selected from the signal processing devices whose residual amount of resource after the functions except the resource controlling function are defined is in excess of an amount of resource required to furnish the resource controlling function.

44. The multimode communication apparatus, according to claim 35, wherein, as the signal processing device into which the resource controlling function is furnished, the signal processing device whose variation in the residual amount of resource caused by the corresponding function variation is minimum is selected from the signal processing devices whose residual amount of resource after the functions except the resource controlling function are defined is in excess of an amount of resource required to furnish the resource controlling function.

45. The multimode communication apparatus, according to claim 35, wherein, as the signal processing device into which the resource controlling function is furnished, the signal processing device whose operating speed of the resource controlling function is maximum is selected from the signal processing devices whose residual amount of resource after the functions except the resource controlling function are defined is in excess of an amount of resource required to furnish the resource controlling function.

46. The multimode communication apparatus, according to claim 35, wherein, as the signal processing device into which the resource controlling function is furnished, the signal processing device whose predetermined priority is high is selected from the signal processing devices whose residual amount of resource after the functions except the resource controlling function are defined is in excess of an amount of resource required to furnish the resource controlling function.

47. The multimode communication apparatus, according to claim 35, wherein a state where the resource controlling function is furnished into no signal processing device is set as an initial setting state, and the resource controlling function is furnished into a predetermined signal processing device in the initial setting state.

48. The multimode communication apparatus, according to claim 35, further comprising:
 a storing portion that stores a source code as an origin of data defining the resource controlling function instead of the data defining the resource controlling function; and
 a data generating portion that generates the data defining the resource controlling function from the source code;
 wherein, after the source code read from the storing portion is translated into the data defining the resource controlling function by the data generating portion, the resource controlling function is furnished into the plurality of signal processing devices.

49. The multimode communication apparatus, according to claim 48, wherein the data generating portion is furnished into the signal processing device.

50. The multimode communication apparatus, according to claim 35, wherein the data expanding portion is furnished into the signal processing device.

51. The multimode communication apparatus, according to claim 35, wherein, when the function of one signal processing device into which the resource controlling function is furnished is varied in the plurality of signal processing devices whose function can be varied, the function of an objective signal processing device is varied after the resource controlling function is shifted to an other signal processing device.

52. A multimode communication apparatus adapted for a first communication system and a second communication system, comprising:
 a storing portion that stores first definition data for executing a function of the first communication system, second definition data for executing a function of the second communication system, and third definition data for executing a resource controlling function; and
 a signal processing portion that includes a plurality of signal processing devices having resource control portions respectively for executing the resource controlling function based on the third definition data,
 wherein when a communication system is changed from the first communication system to the second communication system in a state that an amount of resource used due to the first definition data in a first signal processing device of the plurality of signal processing devices is lowest and an amount of resource used due to the second definition data in a second signal processing device of the plurality of signal processing devices is lowest, a function of the second signal processing device which has obtained the first definition data from the storing portion is changed by obtaining the second definition data from the storing portion under resource control by the resource control portion of the first signal processing device, and a function of the first signal processing device which has obtained the first definition data from the storing portion is changed by obtaining the second definition data from the storing portion under resource control by the resource control portion of the second signal processing device after the resource control portion of the second signal processing device obtains the third definition data from the storing portion.

* * * * *